(12) United States Patent  
Ijdir et al.

(10) Patent No.: US 10,230,234 B2  
(45) Date of Patent: Mar. 12, 2019

(54) CONTROLLED SWITCHING DEVICES AND METHOD OF USING THE SAME

(71) Applicant: VIZIMAX INC., Longueuil, Quebec (CA)

(72) Inventors: Aziz Ijdir, Montreal (CA); Pierre Taillefer, Boucherville (CA)

(73) Assignee: VIZIMAX INC., Longueuil (CA)

( * ) Notice: Subject to any disclaimer, the term of this patent is extended or adjusted under 35 U.S.C. 154(b) by 223 days.

(21) Appl. No.: 15/323,424

(22) PCT Filed: Jul. 2, 2015

(86) PCT No.: PCT/CA2015/050619  
§ 371 (c)(1),  
(2) Date: Jan. 1, 2017

(87) PCT Pub. No.: WO2016/000080  
PCT Pub. Date: Jan. 7, 2016

(65) Prior Publication Data  
US 2017/0155241 A1 Jun. 1, 2017

Related U.S. Application Data

(60) Provisional application No. 62/020,037, filed on Jul. 2, 2014.

(51) Int. Cl.  
*H02H 7/04* (2006.01)  
*H02H 9/00* (2006.01)  
*H01F 27/42* (2006.01)

(52) U.S. Cl.  
CPC ............ *H02H 9/002* (2013.01); *H01F 27/42* (2013.01); *H02H 7/04* (2013.01)

(58) Field of Classification Search  
USPC .......................................................... 361/38  
See application file for complete search history.

(56) References Cited

U.S. PATENT DOCUMENTS

| | | | | |
|---|---|---|---|---|
| 6,433,980 | B1 * | 8/2002 | Tsutada | H01H 9/56 361/83 |
| 6,493,203 | B1 * | 12/2002 | Ito | H01H 9/563 361/159 |
| 7,576,957 | B2 * | 8/2009 | Zhou | H01H 9/563 361/2 |
| 8,310,106 | B2 * | 11/2012 | Koshiduka | H02H 9/002 307/101 |
| 9,870,879 | B2 * | 1/2018 | Taillefer | H01H 9/56 |
| 10,096,993 | B2 * | 10/2018 | Taillefer | H02H 3/32 |

(Continued)

*Primary Examiner* — Ronald W Leja  
(74) *Attorney, Agent, or Firm* — Robert Brouillette; Brouillette Legal Inc.

(57) ABSTRACT

This invention describes a method and an electrical circuit for controlling the closing of a three-phase circuit breaker with simultaneous pole operation to mitigate the inrush current resulting from power transformer energization by taking into account the residual magnetic flux in the transformer's magnetic core. It is disclosed a method to perform controlled switching on transformer and therefore mitigate the inrush current. It is disclosed that this method can be applied to any configuration of transformers which can be, but not limited to, Y-Δ, Y-Y, Δ-Δ and Δ-Y with either floating or grounded neutral.

14 Claims, 4 Drawing Sheets

(56) References Cited

U.S. PATENT DOCUMENTS

| | | | |
|---|---|---|---|
| 2011/0204870 A1* | 8/2011 | Tsutada | H01H 33/593 323/355 |
| 2012/0281444 A1* | 11/2012 | Dent | H02M 7/53871 363/56.01 |
| 2017/0025849 A1* | 1/2017 | Taillefer | H02H 3/32 |
| 2017/0133838 A1* | 5/2017 | Fotrousi | H02H 9/002 |
| 2017/0155241 A1* | 6/2017 | Ijdir | H01F 27/42 |

* cited by examiner

Figure 1 - Prior Art

CONTROLLED SWITCHING DEVICES AND METHOD OF USING THE SAME

CROSS-REFERENCE TO RELATED APPLICATIONS

The present patent application claims the benefits of priority of U.S. Provisional Patent Application No. 62/020,037 entitled "CONTROLLED SWITCHING DEVICES AND METHOD OF USING THE SAME" and filed at the United-States Patent and Trademark Office on Jul. 2, 2014, the content of which is incorporated herein by reference.

FIELD OF THE INVENTION

The present invention generally relates to the field of electrical engineering. More particularly, the invention relates to devices and methods for reducing the magnitude of inrush current resulting from a power transformer energization by controlling the operations of a three-phase circuit breaker (CB) with simultaneous pole operation, also known as three-pole operated circuit breaker or gang operated circuit breaker. This patent also applies to independently-operated pole circuit breaker with closing all three poles at the same moment. The present invention also relates to controlled switching devices (CSDs) and methods for using the same.

BACKGROUND OF THE INVENTION

Electric power systems typically comprise several power transformers as apparatus. Such power transformers can be either used as step-up or step-down transformers, which mean they are used to either increase or reduce the voltage level of an electrical circuit. Power transformers are generally used by electric utilities in generation, transmission and distribution applications as well as by large energy consumers such as, but not limited to, industries, oil and gas, railway operators, large buildings and facilities.

When a power transformer is de-energized, a residual magnetic flux may remain in the core of the power transformer. It is generally well known that due to that residual magnetic flux, the uncontrolled energization of a transformer may cause inrush currents having several orders of magnitudes of the rated current value of the transformer. Such event may increase or cause stress on electrical apparatus including, but not limited to, power transformers and associated circuit breakers. Induced stress may lead to premature wear of such equipment and may affect the reliability of the power system or plants and potentially lead to major blackout or plant downtime.

Over the years, techniques were developed to mitigate and/or reduce inrush current events. A well-known technique to mitigate power transformer inrush current uses a CB equipped with pre-insertion resistors/closing resistors. Another current technique for mitigating inrush current uses smoothing inductors along with the CB. However, these two known techniques require using more complex CBs with additional components and have proved to add major costs for installation and maintenance. Therefore, it is well-known that these mechanical add-ons increase the frequency of maintenance operations and reduce overall reliability.

A paper entitled "Elimination of Transformer Inrush Currents by Controlled Switching—Part I and II" published in the *IEEE transactions on power delivery*, Vol. 16, No. 2 in April 2001, discloses a new approach making use of controlled switching techniques. This paper describes a method for controlling the closing of a circuit breaker at a precise electrical angle calculated based on the magnitude and polarity of the residual magnetic flux of the transformer. Such paper also demonstrated that using CB with simultaneous pole operation may mitigate the inrush current at the closing moment of the CB in relation to the residual magnetic flux. Such method may be achieved by simultaneously closing the three phases of the CB at an optimum point as a function of the residual magnetic flux pattern. This technique requires that the residual magnetic flux in all three phases are known and that the residual magnetic flux magnitudes of two phases are higher than a certain threshold and follow the typical residual magnetic flux pattern (+r, −r, 0). Therefore, this technique limits the scope of use of such method.

Another paper, entitled "Transformer controlled switching taking into account the core residual flux a real case study" and published in CIGRE 13-201 session 2002, discloses demonstrated field results of the implementation of above mentioned technique. The controlled switching using independently-operated pole circuit breaker has proved to effectively eliminate the inrush current. This approach uses different closing electrical angle of the circuit breaker according to the calculated residual magnetic flux in the transformer core (delayed closing strategy). The residual magnetic flux of each transformer phase resulting from de-energization is calculated using the mathematical integral of the transformer voltage. When energizing the power transformer, the closing angle of the circuit breaker is adjusted in such a way that the prospective magnetic flux produced by the energization matches or equals the residual magnetic flux in that phase. The two other phases are closed n half cycles after the zero crossing voltage edge preceding the first phase to be closed.

While these two documents disclose the effectiveness of method to mitigate inrush current using independently-operated pole circuit breaker, there is a need to find a similar approach for simultaneous-operated poles breaker. For example, many transformers installed on medium-voltage systems are fed using a three-phase CB having simultaneous pole operation.

U.S. Pat. No. 8,310,106 discloses a method to mitigate inrush current for power transformer being energized through a simultaneous closing of three-phase circuit breaker or a non-phase segregated operation-type circuit breaker, without providing the circuit breaker with a resistor or other equipment. Such method of U.S. Pat. No. 8,310,106 defines an area of interest where all the three phases must be energized simultaneously to mitigate the inrush current. This area of interest is defined as the region in which the polarities of the steady-state magnetic flux and the residual magnetic flux coincide for all three phases. Also, this said method defines that one of the points to be targeted inside this area of interest is the intersection of the steady-state magnetic flux and the residual magnetic flux for the phase with the smallest residual magnetic flux among the phases of the three-phase transformer. Also, this same method defines another point on which the simultaneous closing of the three phases should occur. This point is the peak value of the steady-state magnetic flux of the phase that is having the largest residual magnetic flux. This method has limitations since there exist cases where the polarities of the steady-state magnetic flux and the residual magnetic flux can't coincide in the same region for all three phases. For example, in case no delta connection is present on power transformer, the sum of the three residual magnetic fluxes is not 0 all the time and they are all having the same polarity.

Also, nothing can ensure that the intersection of the steady-state magnetic flux and the residual magnetic flux for the phase with the smallest residual magnetic flux among the phases of the three-phase is always located inside the area of interest described on the claim 1 of the U.S. Pat. No. 8,310,106.

There is thus a need for a new technique to potentially mitigate the shortcomings of the prior art and aiming at reducing the transients such as, but not limited to, inrush currents and voltage transients resulting from a transformer energization event using a three-phase circuit breaker using simultaneous pole operation or independent pole operation (i.e. having all three phases operated at the same time for a certain matter), regardless to the magnetic flux pattern inside the said transformer. Thus, there is a need to support all the possible transformer configurations such as, but not limited to, Y-Δ, Y-Y, Δ-Δ and Δ-Y with either floating or grounded neutral, and any vector groups.

SUMMARY OF THE INVENTION

This invention relates to devices and methods achieving controlled switching of power transformers (5) by means of controlling the closing of a circuit breaker (3) with simultaneous pole operation or independent pole operation (with all three phases operated at the same time) with the objective of mitigating the inrush current resulting from transformers energization. More specifically, such devices and methods determine the optimal electrical switching angle of the circuit breaker (3) according to the residual magnetic fluxes of each phases in the transformer's core resulting from its previous de-energization. The residual magnetic fluxes from each phase are calculated from the mathematical integral of the transformer voltage. The transformer voltages are measured using instrument transformers (6 or optionally 8). After having calculated each of the residual magnetic fluxes, the controlled switching device will determine the circuit breaker's closing angle so that it corresponds to the phase with the minimum residual magnetic flux. Thanks to this approach, the controlled switching device is able to close the circuit breaker at an optimum electrical angle, then achieving inrush current mitigation during transformer's energization.

According to one object of the present invention, the present invention discloses a method for lowering the inrush current resulting from a power transformer (5) energization in an electrical circuit comprising a three-phase circuit breaker with simultaneous pole operation (3) or independent pole operation (with all three phases operated at the same time). The method comprises the step of providing the electrical circuit with a controlled switching device (7) adapted to send a close command to a circuit breaker (3) in order to synchronize its mechanical operation to reduce inrush current. In this example, the CSD is connected to the potential transformers on the primary side of the transformer (6) or optionally on the secondary side (8). The said method allows controlled switching of a power transformer. In a preferred embodiment, when the three-phase circuit breaker with simultaneous pole operation or independent pole operation (with all three phases operated at the same time) of a transformer is opened or when the power transformer is de-energized, the method allows the reclosing of said circuit breaker at an optimal electrical angle to mitigate inrush current.

The present disclosure may be applied to any type of connections of transformers, which can be, but not limited to, Y-Δ, Y-Y, Δ-Δ and Δ-Y with either floating or grounded neutral, and any vector groups.

In another object of the present invention, the method disclosed herein further comprises the step of adjusting the CSD to close the CB of the electrical circuit at an optimal electrical angle to reduce the inrush current resulting from the energization of a power transformer.

In a further object of the present invention, the controlled switching device is connected to any unloaded power transformer. The method then further comprises the step of calculating the residual magnetic fluxes inside the transformer's magnetic core by measuring the voltage on the primary or secondary side of the transformer in order to calculate the optimal electrical closing angle of the CB.

In another object of the present invention, the method disclosed herein comprises the step of reducing the inrush current produced by the energization of the power transformer controlled by a three-phase CB with simultaneous pole operation or independent pole operation (with all three phases operated at the same time for a certain matter) while knowing the transformer's residual magnetic flux.

The present invention uses a CSD to control a power transformer energization by closing a three-phase CB with simultaneous pole operation or independent pole operation (with all three phases operated at the same time for a certain matter) of an electric circuit at an optimal electrical angle to reduce an inrush current provided to the electrical circuit.

The said inrush current reduction is achieved through the use of a controlled switching device, alternatively known as a point on wave (POW) controller.

As found in prior art, each time a transformer is de-energized such as by receiving a protection trip signal or a voluntary command or by having a voltage loss in the power system, a residual magnetic flux may remain in each phase of the transformer's magnetic core. To optimize the inrush current mitigation on the next energization, this said residual magnetic fluxes must be taken into account to calculate the optimal electrical closing angle on which to close the CB. The present disclosure provides that each time the transformer is de-energized, the voltage is measured either at the high voltage or low voltage side of the transformer, then the residual magnetic flux is calculated, and then the information is processed by the controlled switching device. Furthermore, with the residual magnetic flux information, the controlled switching device will be able to determine the optimal closing angle for the future transformer energization, hence reducing optimally the inrush current.

In another object of the present invention, a method allowing optimal inrush current mitigation from a transformer's energization controlled by a three-phase circuit breaker with simultaneous pole operation or independent pole operation (with all three phases operated at the same time for a certain matter) of an electrical circuit is disclosed. Such electrical circuit comprises a circuit breaker (simultaneous pole operation or independent pole operation (with all three phases operated at the same time for a certain matter)), an unloaded power transformer and being electrically fed with an electrical current, the method comprising the steps of providing the electrical circuit with a controlled switching device adapted to send an open or close command to the circuit breaker taking into account the transformer's residual magnetic flux in order to reduce an inrush current sent to the electrical circuit.

In a further object of the present invention, the said method may further use the step of determining the Minimum Flux Simultaneous Closing Strategy (MFSCS) to energize the transformer. This said strategy is based on closing the CB at an angle, which matches the lowest residual magnetic flux in the transformer's core.

The method may further comprise automatically adjusting the electrical switching angle of the circuit breaker based on a further step to calculate all three residual magnetic fluxes in the transformer's core.

In another object of the present invention, the use of a CSD in a circuit comprising a three-phase circuit breaker with simultaneous pole operation or independent pole operation (with all three phases operated at the same time for a certain matter) and a power transformer is disclosed, wherein the CSD is adapted to send a close command to the CB to control the transformer's energization in order to synchronize a close mechanical operation of the circuit breaker to reduce an inrush current sent to an electrical circuit comprising the controlled switching device and at least one transformer.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel controlled switching device and method using the same will be described hereinafter. Although the invention is described in terms of specific illustrative embodiment(s), it is to be understood that the embodiment(s) described herein are by way of example only and that the scope of the invention is not intended to be limited thereby.

This invention relates to the switching of power transformers by controlling the operations of a CB to mitigate and/or eliminate the inrush current using a CSD, wherein the CSD automatically determines the optimal electrical switching angle of the CB according to the magnitude and the polarity of residual magnetic flux in the core of the transformer. The CSD evaluates the magnetic residual magnetic flux by means of mathematical integration of the measured voltage at the transformer primary or secondary side when the transformer is de-energized.

Figure 1:
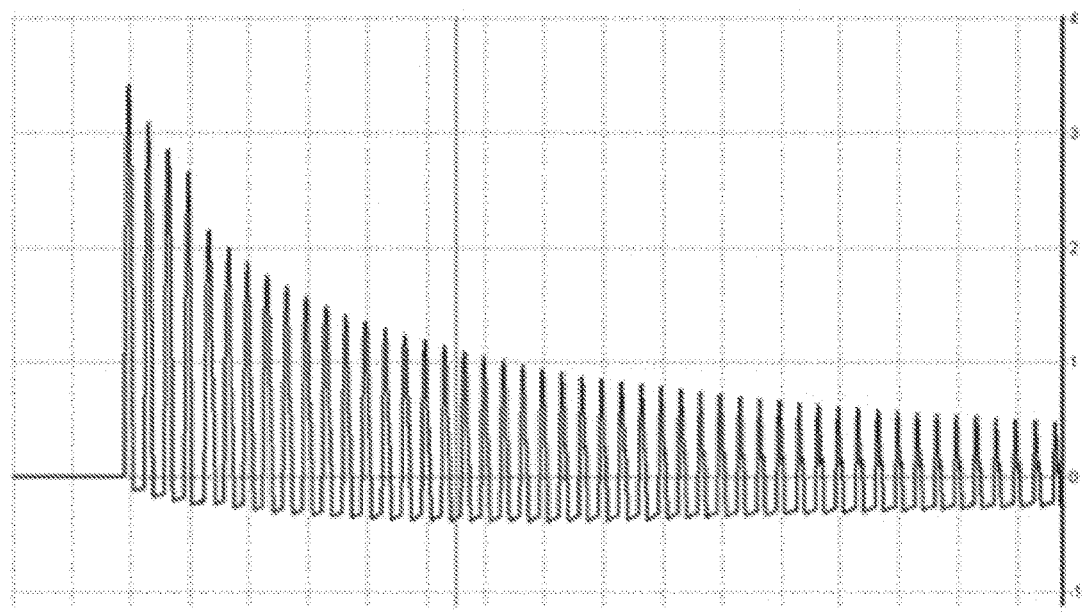
FIG. 1 graphically illustrates an example of inrush current as a function of time (Prior Art).
Figure 2:
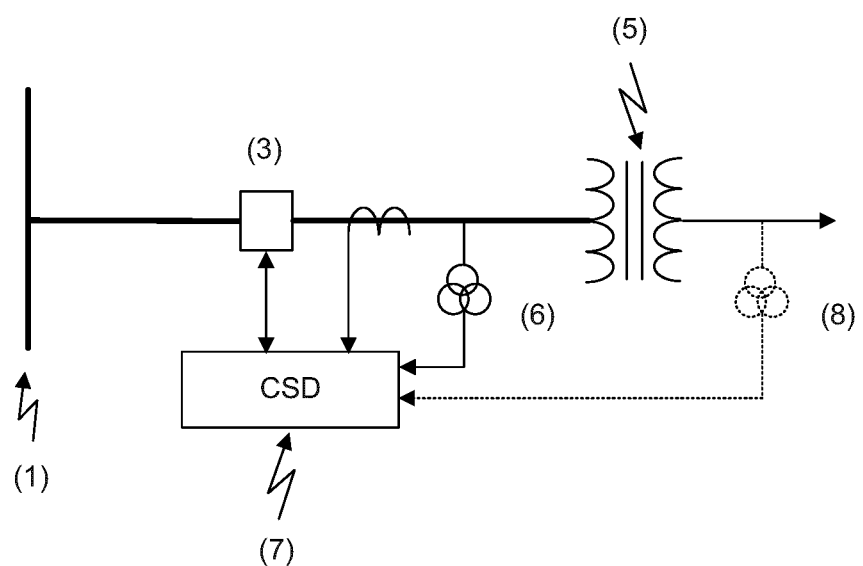
FIG. 2 illustrates a typical circuit with a power transformer controlled using a three-pole circuit breaker with simultaneous pole operation comprising a controlled switching device.

Now referring to FIG. 2, an example of an electrical circuit connected to a transformer (5) connected to the voltage source (1) using a circuit-breaker (3) on its primary side is shown. Such an installation typically comprises a CSD (7) and instrument transformers (6 or optionally 8). The CB (3) controls the energization of the transformer (5).

The present disclosure provides a new method to energize an unloaded power transformer at an optimum angle in order to mitigate/reduce the inrush current. In a preferred embodiment, a CSD runs computer program implementing an algorithm mitigating the inrush current using the level of residual magnetic flux of all the 3 phases of a power transformer. In such an embodiment, the power transformer may be either a 3 single-phase transformers or a 3-phase power transformer. Such method is applied to CB with simultaneous pole operation, which energizes the power transformer.

Figure 3:
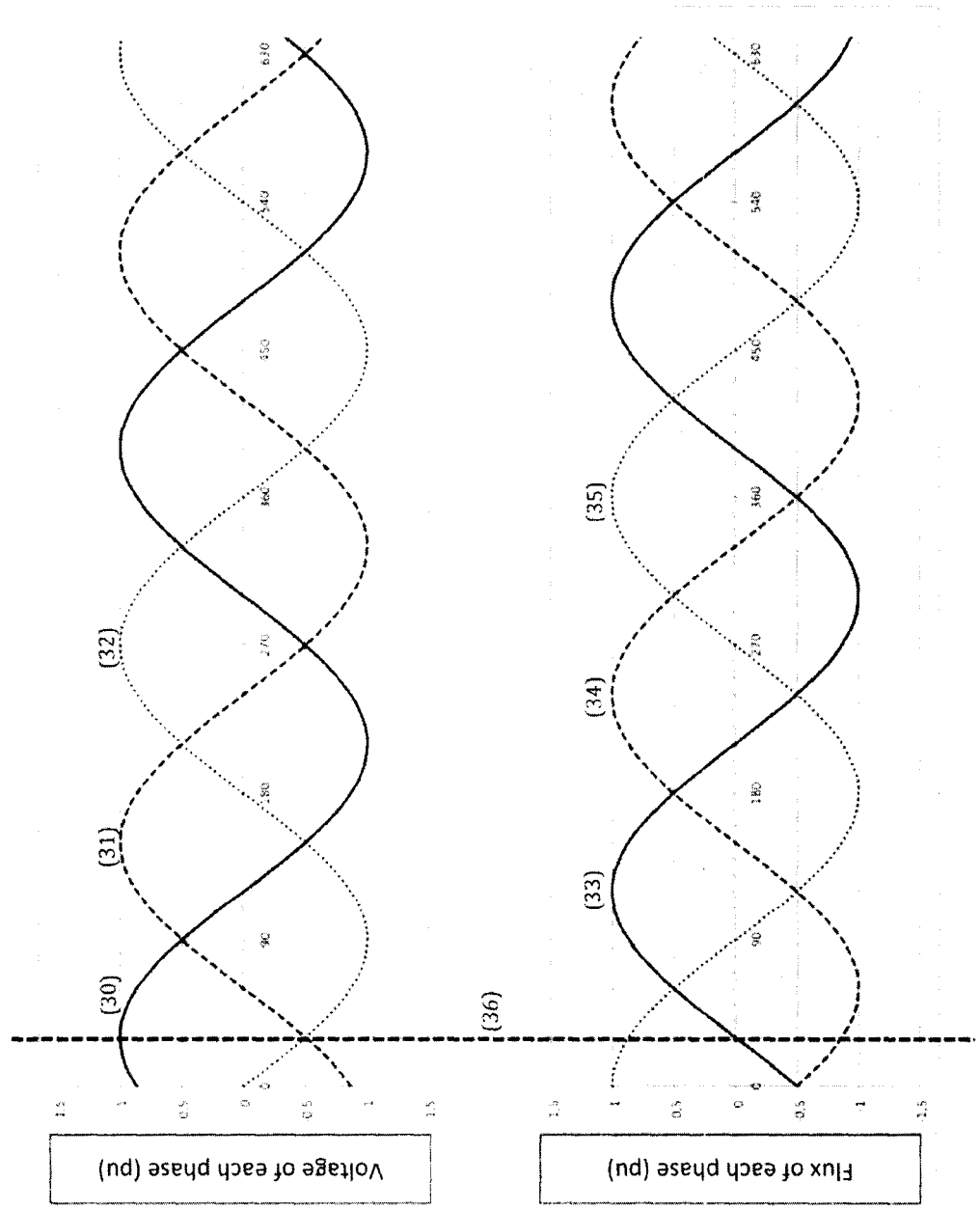
FIG. 3 graphically illustrates an example showing the relation between the 3-phase voltage signal and the related flux inside the transformer.

Now referring to FIG. 3, the amplitude of a 3-phase voltage A (30), B (31) and C (32) and the 3 phases of the flux amplitude A (33), B (34) and C (35) are illustrated. The values are expressed in pu. It can be seen that the flux is lagging the voltage by 90 degrees (36).

The method comprises calculating the residual magnetic flux of each transformer phase resulting from the de-energization of the power transformer using mathematical integral of the transformer voltage measured on its primary or secondary side, as shown in FIG. 2. After the de-energization of the transformer, the CSD calculates the prospective flux to be present in the transformer in an energized state. The power transformer is energized by simultaneously closing all the CB poles at an angle which produces a prospective flux on the phase having the minimum absolute residual magnetic flux and having the lowest matching closing angle dispersion in reference to the 2 other phases.

Figure 4:
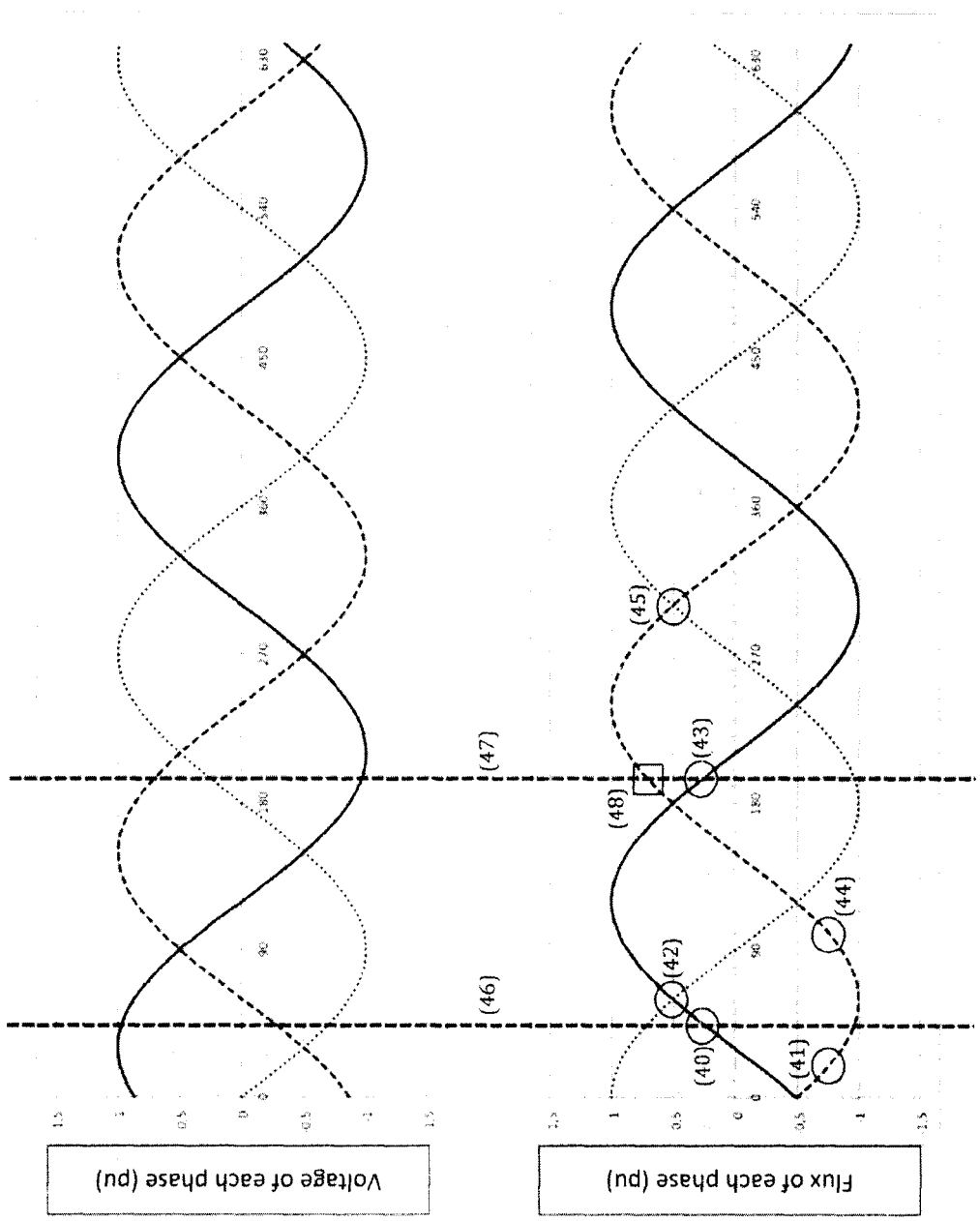
FIG. 4 graphically illustrates an example showing the optimum closing angle for residual magnetic flux corresponding to a flux pattern of (+0.25, −0.75, +0.5) respectively for phase A, B, and C.

Now referring to FIG. 4, an example of the optimum closing angle for residual magnetic flux corresponding to +0.25 p.u. (40), −0.75 p.u. (41), +0.5 p.u. (42) respectively for phases A, B, and C, is illustrated. According to this embodiment, the closing angle should be selected according to the phase having the minimum absolute residual magnetic flux magnitude. In this example, since phase A has a residual magnetic flux of a 0.25 p.u. (40), it shall be selected. In an embodiment using a 3-phase system, only 2 solutions corresponding to the phase A minimum residual magnetic flux exist ((40) and (43)). In a first solution (46) (closing all the three phases at (40)), the residual magnetic fluxes of phase B (41) and phase C (42) have a minimal flux difference between the prospective magnetic fluxes and their respective residual magnetic fluxes when the transformer is energized. In the second solution (47), there is a 100 degrees closing angle dispersion between the prospective flux on phase B (48) and its residual magnetic flux (44) when the transformer is energized. Since the maximum closing angle dispersion in the first solution (46) is inferior to the maximum closing angle in the second solution (47), the second solution (47) should be discarded, in order to attain the optimum closing angle for the CB. Since the dispersion of the closing angle of the first solution (46) is inferior, such solution shall be selected for the optimum closing angle of the CB.

A CSD according to the principles of the present invention monitors the voltage on the primary or secondary side of the transformer in order to calculate the value of the residual magnetic flux in each phase calculated as follow:

$$\phi(t) = \int v(t) dt$$

where $\phi$ is the magnetic flux v is the transformer phase voltage

One skilled in the art shall understand that any prior art electrical components or future derivatives of such components, such as, but not limited to, circuit breakers, current and potential transformers, capacitive loads, POW and CSD may be used in association with the present method. In particular, the U.S. Pat. No. 6,433,980 B1 discloses the main functionality of a CSD that may be used herein. Also, the U.S. Pat. No. 7,576,957 B2 describes the main functionality of a POW which may be used herein. The content of U.S. Pat. No. 6,433,980 B1 and U.S. Pat. No. 7,576,957 B2 are enclosed herewith by reference.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

What we claim is:

1. A method for reducing inrush current caused by a power transformer connected to an electrical circuit comprising a circuit breaker (CB) fed with a multi-phase electric current, the method comprising:
    allowing energization of the power transformer;
    connecting to the electrical circuit with the CB;
    using a controlled switching device (CSD) connected to the CB;
    using the CSD to send a command to the CB in order to close the CB at an optimal angle allowing minimization of inrush current, the optimal angle being a location on a voltage sinusoidal-like waveform; and
    receiving by the CSD control commands from a protective or automation device;
    calculating two electrical angles based on a phase having absolute minimum residual magnetic flux of three phases;
    determining intersections of the two calculated angles with prospective flux of the phase of the two calculated angles;
    determining intersections of residual magnetic fluxes of the two other phases with their prospective fluxes;
    determining the minimum closing angle dispersion between the two calculated angles and intersections of the residual magnetic fluxes of the two other phases with their prospective fluxes; and
    energizing the power transformer at the determined minimum closing angle dispersion.

2. The method of claim 1, wherein the transformer has a primary and secondary side and wherein the method further comprises:
    measuring a voltage at the primary or the secondary side of the transformer;
    calculating residual magnetic flux in the transformer;
    sending of a close command to the CB based on the calculated residual magnetic flux.

3. The method of claim 2, wherein the method further comprises:
    measuring the voltage of each phase of the multi-phase electric current;
    calculating the residual magnetic flux using mathematical integral of the measured voltage of each phase.

4. The method of claim 3, wherein the method further comprises monitoring the voltage of each phase to determine the residual magnetic flux calculation and an optimal time for sending a close command, the optimal time being function of the closing angle and the CB mechanical closing time.

5. The method of claim 3, wherein the calculation of the residual magnetic flux is calculated following:

$$\phi(t)=\int v(t)dt$$

wherein v is the transformer phase voltage at primary or secondary side of the transformer.

6. The method of claim 1, the method further comprising automatically adjusting an electrical switching angle of the CB, the electrical switching angle being a location on a voltage sinusoidal-like waveform.

7. The method of claim 6, wherein the electrical switching angle of the CB is adjusted based on the calculation of a level of internal magnetic fluxes inducted by currents of phases A, B and C.

8. An electric circuit electrically fed by a current, the electric circuit allowing energization of a transformer, the transformer comprising a core and having an internal magnetic flux, the electric circuit comprising:
    a circuit breaker (CB);
    a controlled switching device (CSD) configured to:
        determine an optimal electrical switching angle of the CB according to magnitude and polarity of a residual magnetic flux of the transformer to allow the switching of transformer;
        dynamically adjust the closing of the CB when prospective flux is equal to absolute minimum residual magnetic flux of three phases;
        calculate two electrical angles based on a phase having the absolute minimum residual magnetic flux of the three phases;
        determine intersections of the two calculated angles with prospective flux of the phase of the two calculated angles;
        determine intersections of residual magnetic fluxes of the two other phases with their prospective fluxes;
        determine the minimum closing angle dispersion between the two calculated angles and intersections of the residual magnetic fluxes of the two other phases with their prospective fluxes; and
        send a command to the CB to synchronize mechanical closing time of the CB in order to energize the transformer at the determined minimum closing angle dispersion.

9. The electric circuit of claim 8 where the CB is open to electrically isolate the transformer causing a residual magnetic flux inside the transformer.

10. The electric circuit of claim 8, the transformer being selected in one of the following types: Y-Δ, Y-Y, Δ-Δ and Δ-Y, with either floating or grounded neutral.

11. The electric circuit of claim 8, wherein the transformer comprises any group of vector.

12. The electric circuit of claim 8, wherein the CSD is configured to calculate an optimal electrical angle required to energize the transformer.

13. The electric circuit of claim 8, wherein the CSD is configured to dynamically adjust the closing of the CB when voltage of the electrical circuit is equal to integral of the internal residual magnetic flux in the core of the transformer.

14. Use of the electrical circuit of claim 8, wherein the CSD is configured to determine the optimal electrical switching angle of the CB according to the magnitude of the internal residual magnetic flux to allow energization of the transformer.

* * * * *